United States Patent
Huhn et al.

(10) Patent No.: US 6,492,039 B2
(45) Date of Patent: Dec. 10, 2002

(54) COMPOSITE MULTILAYER MATERIAL FOR PLAIN BEARINGS

(75) Inventors: Hans-Ulrich Huhn, Schlangenbad (DE); Peter Spahn, Mühltal (DE); Dietmar Wiebach, Wiesbaden (DE); Achim Adam, Nauheim (DE); Fritz Niegel, Oestrich-Winkel (DE)

(73) Assignee: Federal-Mogul Weisbaden GmbH & Co. KG (DE)

( * ) Notice: Subject to any disclaimer, the term of this patent is extended or adjusted under 35 U.S.C. 154(b) by 0 days.

(21) Appl. No.: 09/748,610

(22) Filed: Dec. 26, 2000

(65) Prior Publication Data

US 2001/0016267 A1 Aug. 23, 2001

(30) Foreign Application Priority Data

Dec. 28, 1999 (DE) .......................................... 199 63 385

(51) Int. Cl.⁷ .............................................. F16C 33/12
(52) U.S. Cl. ..................... 428/648; 428/675; 384/912
(58) Field of Search .................... 428/647, 648, 428/652, 675, 935; 384/912

(56) References Cited

U.S. PATENT DOCUMENTS

| | | | |
|---|---|---|---|
| 4,140,835 A | * | 2/1979 | Goddard et al. ............. 428/648 |
| 4,608,085 A | * | 8/1986 | Eudier et al. ................. 75/247 |
| 5,209,578 A | | 5/1993 | Eastham et al. |
| 5,450,784 A | * | 9/1995 | Shureb ........................ 92/223 |
| 5,512,242 A | * | 4/1996 | Tanaka et al. ............... 420/561 |
| 5,943,941 A | * | 8/1999 | Kato et al. ................... 92/12.2 |
| 6,077,815 A | * | 6/2000 | Grunthaler et al. ......... 508/108 |
| 6,194,087 B1 | * | 2/2001 | Huhn et al. ................. 428/646 |
| 6,301,784 B1 | * | 10/2001 | Niegel et al. ............ 29/898.12 |

FOREIGN PATENT DOCUMENTS

| | | | |
|---|---|---|---|
| DE | 3623929 A1 | * | 1/1988 |
| DE | 19728777 A1 | | 4/1999 |
| EP | 0908539 A2 | | 4/1999 |
| EP | 1048753 A1 | | 2/2000 |

\* cited by examiner

*Primary Examiner*—John J. Zimmerman
(74) *Attorney, Agent, or Firm*—Reising, Ethington, Barnes, Kisselle, Learman & McCulloch, P.C.

(57) ABSTRACT

A composite multilayer material is described, which exhibits a relatively high specific load carrying capacity and relatively low wear. The composite multilayer material for plain bearings comprises a backing layer, a bearing metal layer (1), a first intermediate layer (2) of nickel, a second intermediate layer (3) of tin and nickel together with an overlay (4) consisting of copper and tin. The overlay (4) comprises a tin matrix (5), into which tin-copper particles (6) are incorporated, which consist of 39 to 55 wt. % copper, the rest being tin. At high temperatures, as occur in the case of plain bearings used in internal combustion engines, the tin migrates into the second intermediate layer (3) therebelow, resulting in concentration of the tin-copper particles (6).

9 Claims, 4 Drawing Sheets

COMPOSITE MULTILAYER MATERIAL FOR PLAIN BEARINGS

DESCRIPTION

1. Technical Field

The invention relates to a composite multilayer material for plain bearings, comprising a backing layer, a bearing metal layer, a first intermediate layer of nickel and a second intermediate layer of tin and nickel together with an overlay consisting of copper and tin.

2. Related Art

Composite multilayer materials with the structure comprising steel backing/lead-bronze/overlay of lead, tin and copper have proven very reliable and to have a high mechanical load carrying capacity. Such composite multilayer materials are described in *Glyco-Ingenieurberichte* 1/91, for example.

The electrodeposited overlay in particular is a multifunctional material, which, inter alia, takes on the following tasks:
embeddability with respect to foreign particles
running-in or conformability of sliding counterparts
corrosion protection for the lead-bronze
emergency running properties in the case of an oil shortage.

The bearing metal also contains certain emergency running reserves in case the overlay is completely worn away. However, these bearing designs, which have proven effective for decades, today still contain quantities of lead, principally in the overlay. A common alloy consists, for example, of PbSn10Cu2, a nickel intermediate layer being provided as a diffusion barrier between the bearing metal and the overlay.

These known layers exhibit low hardnesses of around 12–15 HV, and therefore exhibit good embeddability and are insensitive to scuffing. However, for the same reason they have only limited load carrying capacities and are often no longer suitable for the loads imposed by new engine developments, particularly in the field of diesel engines. The layers are also unsatisfactory because of the environmental significance of the heavy metal lead.

Hard layers are also being used in ever increasing numbers in heavily loaded bearing systems, such as for example aluminum-tin layers with hardnesses of around 80 HV deposited by PVD methods. These methods make such layers substantially more costly, however. The bearings are highly wear resistant, but are scarcely embeddable and are therefore generally combined with counter-shells in the form of soft, lead-containing layers.

Pure tin is not suitable as an overlay, since, with a hardness of around 10 HV, it is even softer than the conventional lead alloys and thus is incapable of absorbing the loads which arise in main and connecting rod bearings. Alloys containing copper have therefore already been proposed, to make tin layers more resistant by increasing hardness.

DE 197 28 777 A1 relates to the production of a lead-free bearing with an overlay of SnCu, the copper content varying from 3–20 wt. %. With the aid of a methylsulfonic acid electrolyte with grain-growth inhibiting additives, a layer is produced which has at least the properties of conventional standard lead-based ternary layers. In order to produce a further improvement in wear resistance, it is intended that hard material particles dispersed in the bath be incorporated into the layer.

DE 197 54 221 A1 proposes to deposit cobalt in addition to tin and copper, in order to achieve a further increase in mechanical load carrying capacity and to prevent embrittlement of the coupling layer between overlay and nickel diffusion barrier layer, since the cobalt reduces the tendency of the tin to diffuse into the nickel. However, this addition of cobalt to the alloy complicates the deposition process, which may reduce process reliability.

It is therefore the object of this invention to provide a composite multilayer material with a tin-copper-based overlay, which material simultaneously
exhibits a higher specific load carrying capacity and lower wear than conventional lead-based layers
is conformable and allows the embedding of dirt particles
does not require co-deposition of further components or dispersoids
and is more economic to produce than the materials produced by PVD methods.

SUMMARY OF THE INVENTION

This object is achieved with a composite multilayer material, the overlay of which comprises a tin matrix into which tin-copper particles are incorporated, which consist of 39 to 55 wt. % copper, the rest being tin.

Studies have shown that, with this layer structure, the bearing stabilizes itself after running-in on the initially still soft layer through heating during operation and forms a surface with good fatigue strength.

The particles are intermetallic phases, which have previously been deemed disadvantageous in overlays and consequently avoided. It has been shown, however, that these tin-copper particles markedly reduce wear on account of their hardness, wherein it has surprisingly emerged that, at temperatures from approximately 120° C., increased tin diffusion occurs into the tin-nickel layer underneath. Through migration of the tin out of the overlay, the tin-copper particles become increasingly concentrated. The thus changing overlay exhibits a high load carrying capacity and high wear resistance.

It has emerged that, at high temperatures and after very long operating periods, for example after 1000 hours, the tin content is so markedly reduced that the tin-copper particle fraction predominates in the overlay.

The content of particles per unit area, relative to any cross-sectional area, is preferably 5 to 48%. This content increases over a lengthening service life as a result of tin migration and may amount to up to 95% after a service life of more than 1000 hrs. If the particle content is below 5%, the properties of the overlay are determined solely by the tin, which does not perform adequately alone. Above 48%, the formation of relatively large conglomerates of particles can no longer be avoided, and these finally take over the role of the matrix, which then no longer exhibits sufficient embeddability and conformability in the running-in phase owing to the high level of hardness.

The diameter of the particles preferably amounts to 0.5 to 3 μm. Particles which are too large, having an average diameter of over 3 μm, result in non-homogeneous layer properties, which influence the properties of a plain bearing made from the multilayer material, particularly in the running-in phase. Particles which are too fine, having an average diameter of below 0.5 μm, increase the initial hardness too markedly, hinder the supply of tin to the tin-nickel layer and thus further stabilization of the bearing and exhibit reduced corrosion resistance with regard to hot engine oil.

It has additionally emerged that the second intermediate layer should be so adjusted, with regard to both layer thickness and tin content, that it is able to absorb tin migrating from the overlay. The migration rate of the tin and thus the modification of the wear resistance and load carrying capacity of the overlay as a function of time may be adjusted by means of the thickness and tin content of the second intermediate layer.

It is preferable for 30 to 40 vol. % of the second intermediate layer to be nickel and the rest to be tin, which corresponds approximately to an atomic ratio of 1:1. The thicker is the tin-nickel layer, the more tin may be absorbed from the overlay. The wear resistance of the overlay increases relatively rapidly in this instance.

A ratio of from 2 to 4 has emerged as the preferred ratio of the overlay thickness to the thickness of the second intermediate layer.

The layer thickness of the overlay is preferably from 5 to 25 μm. The overlay may be applied by electrodeposition.

The layer thickness of the second intermediate layer is preferably between 2 and 7 μm.

The layer thickness of the first intermediate layer of pure nickel is preferably from 1 to 4 μm. The nickel layer also contributes to the equilibrium-determined growth of the tin-nickel layer, in that the latter is not only fed with tin from the overlay thereabove, but also with nickel from the first intermediate layer. In this way, the 1:1 ratio of tin to nickel in the tin-nickel layer is maintained. The bearing metal may be selected at will. It has emerged that the bearing metal layer does not have any direct effect on tin migration from the overlay and thus has no effect on concentration of the tin-copper particles. The bearing metal layer may consist, for example, of a copper alloy with a copper content of from 50 to 95 wt. % or an aluminum alloy with an aluminum content of from 50 to 95 wt. %. Copper-aluminum, copper-tin, copper-tin-lead, copper-zinc, copper-zinc-silicon, copper-zinc-aluminum, or copper-aluminum-iron alloys may be used as bearing metals.

Production of the composite multilayer material according to the invention may proceed as follows.

The two intermediate layers of nickel and tin-nickel are applied chemically or electrochemically in a first stage to prefabricated plain bearings, especially bearing shells, comprising the steel and bearing metal composite. The sliding layer is then deposited by electroplating. A binary alkylsulfonic acid electroplating bath is used for this purpose without brighteners and grain-refining agents and with the addition of non-ionic wetting agents, free alkylsulfonic acid and a fatty acid glycol ester. Coarse deposition of the tin-copper particles is attributable to the fact that no grain-refining agent is used, as is used to achieve the most finely divided possible grain structure desired according to the prior art.

THE DRAWINGS

Exemplary embodiments of the invention are explained below with reference to the drawings, in which.

DETAILED DESCRIPTION

An exemplary composite multilayer material was produced as follows:

A bearing metal layer of CuPb22Sn was initially applied to a steel backing layer. In the next stage, after a conventional pretreatment process, a first intermediate layer of nickel was applied to the bearing metal layer from a Watt's nickel electrolyte.

A second intermediate layer consisting of nickel and tin is electrodeposited on this first intermediate layer. A modified chloride/fluoride electrolyte is used for this purpose.

The tin-based overlay is then electrodeposited on the nickel-tin intermediate layer thus produced. For application of the overlay, the following aqueous-based electrolyte system may be used:

| | |
|---|---|
| $Sn^{2+}$ in form of tin methanesulfonate | 30–45 g/l |
| $Cu^{2+}$ in form of copper methanesulfonate | 2–8 g/l |
| Methanesulfonic acid | 80–140 g/l |
| Electrolyte additive N-HMB | 30–45 ml/l |
| Resorcinol | 1.5–4 g/l |

The electrolyte additive N-HMB is a wetting agent based on alkylaryl polyglycol ether made by Enthone OMI.

To stabilize the copper fraction, long-chain polyglycol ethers may additionally be used.

The quality of the water used has to correspond to that of pure deionised water. For stable deposition conditions, it is absolutely necessary for the electrolyte to be circulated fully through a filtration installation at least once per hour. In this way, some of the $Sn^{4+}$ arising is removed. Too great an increase in the level of $Sn^{4+}$ in the electrolyte may result in an imperfect layer structure with phase variations and uneven layer growth or even in complete failure of the electrolyte.

Pure electrolyte tin is used as the anode material. Deposition of the overlay is performed in a temperature range of from 20° C. to 40° C., advantageously 25° C. to 30° C.

The structure of this overlay is influenced in a lasting manner by the current strengths used. Relatively high current densities result in relatively coarse copper-tin particles. Current densities which are too low result in uncontrolled displacement of the copper phase fraction. A current density range of from 1.5 to 3.0 A/dm$^2$ has therefore proven advantageous.

The distance from anode to cathode should not exceed 350 mm, since variations in the internal electrolyte resistance lead to uneven current density distributions along the bearing column. The anode-cathode surface area ratio must be approximately 1:1 (±10%).

Figure 1:
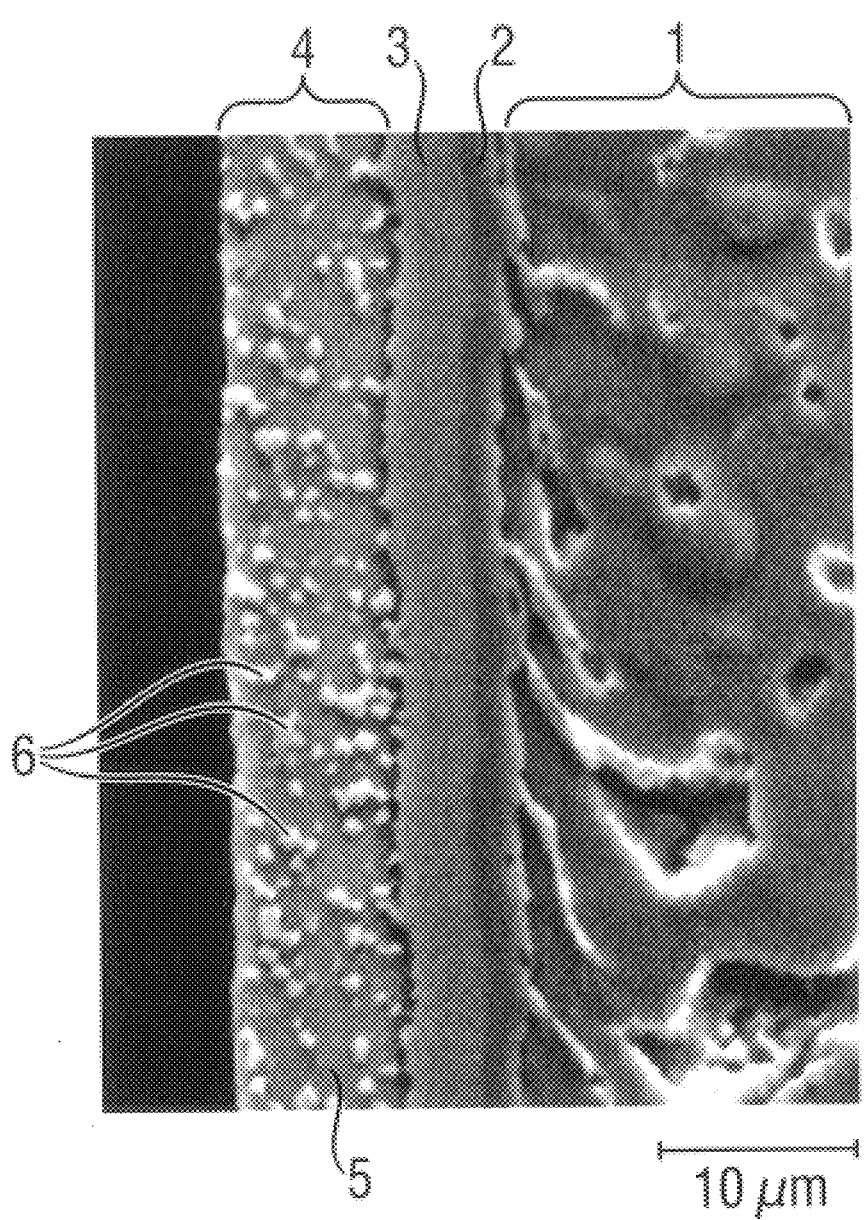
FIG. 1 shows a section through a composite multilayer material.
Figure 2:
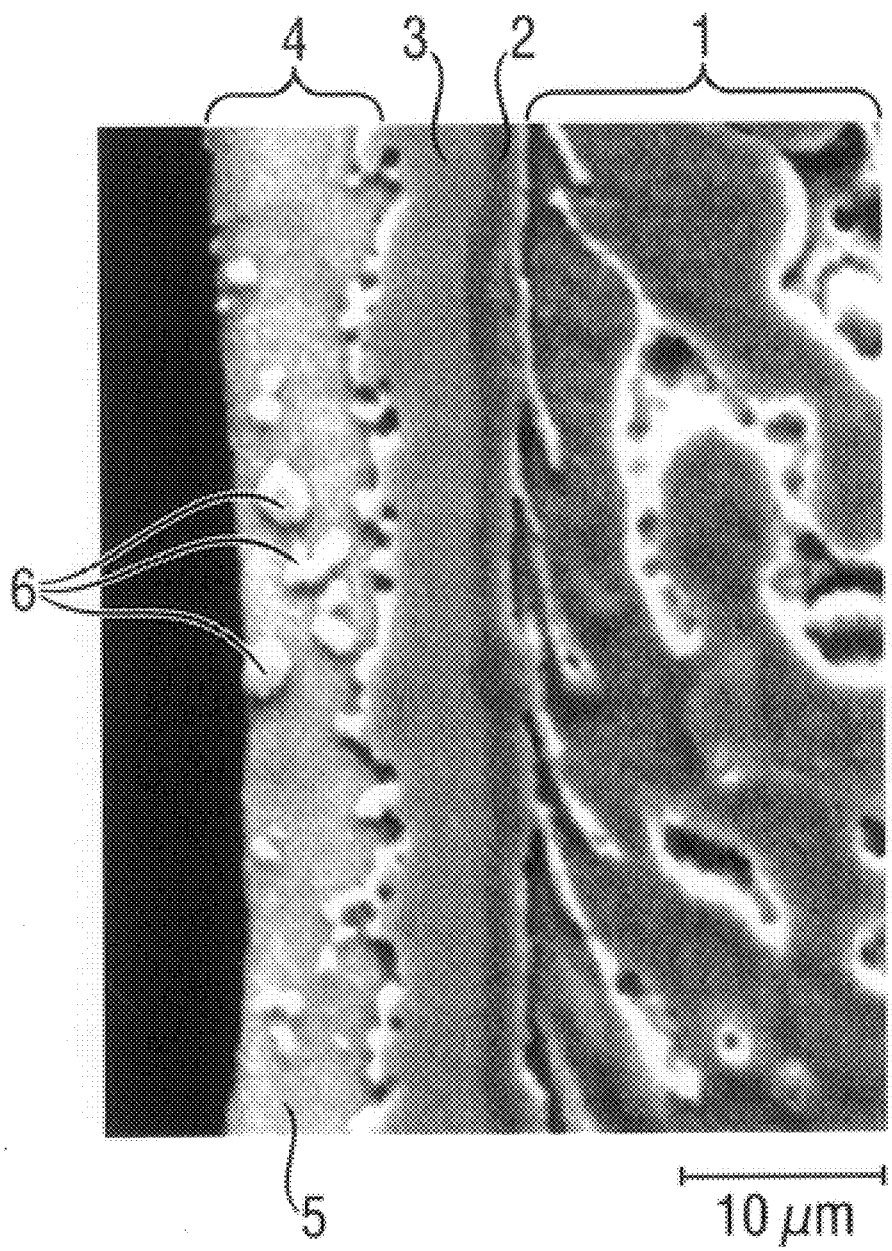
FIG. 2 shows a section through the composite multilayer material after heat treatment for 250 hrs.
Figure 3:
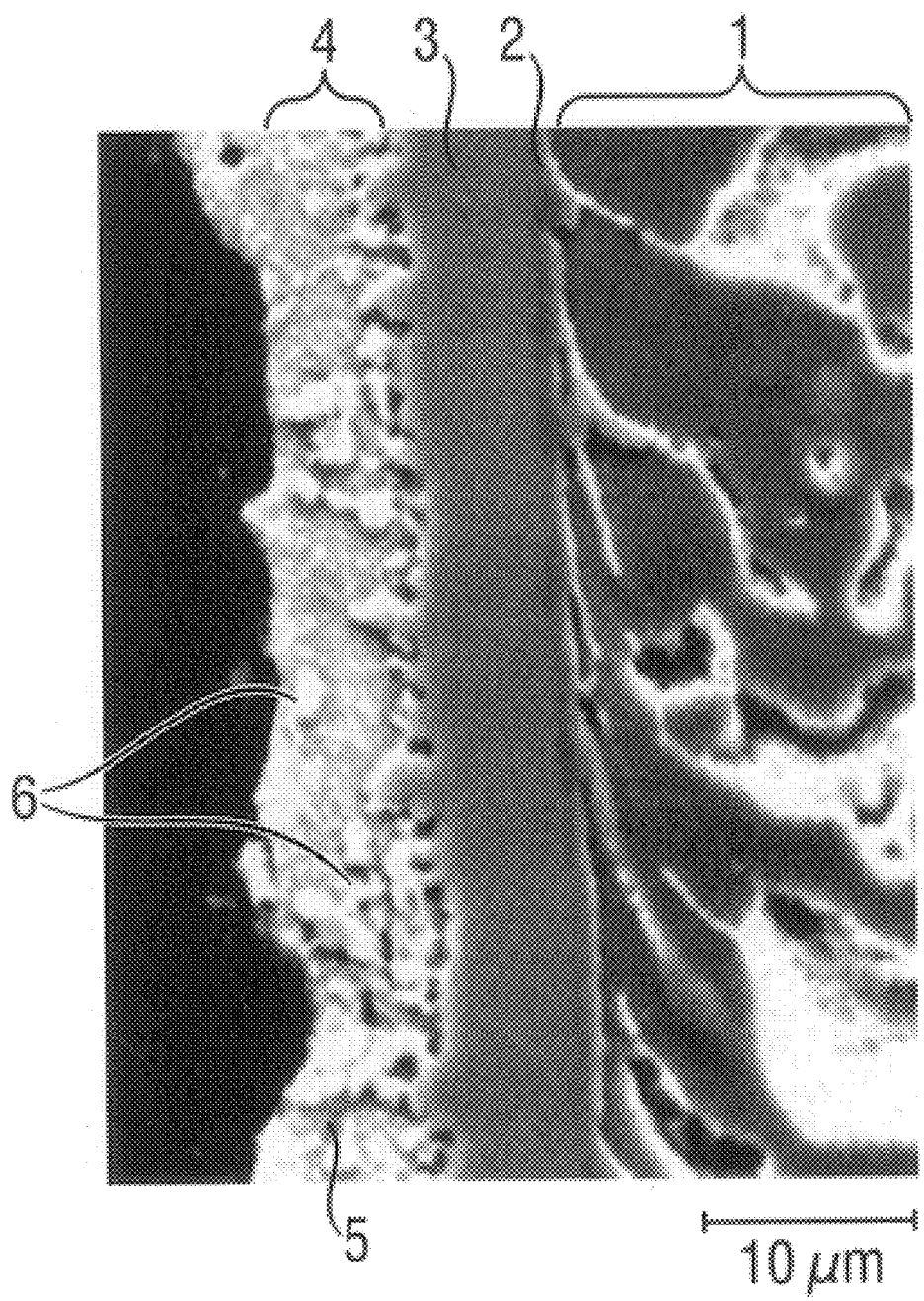
FIG. 3 shows a section through the composite multilayer material after heat treatment for 750 hrs.

FIG. 1 shows a section through this composite multilayer material enlarged 2500 times, said material having, on a backing layer which is not shown, a layer 1 of a bearing metal of CuPb22Sn, a first intermediate layer 2 of nickel, a second intermediate layer 3 of nickel-tin and an overlay 4. The latter consists of a tin matrix 5, into which particles 6 of tin-copper are incorporated. These incorporated particles are distributed throughout the entire overlay 4 and partially amalgamated to form agglomerates.

To simulate the operating conditions of a plain bearing in an internal combustion engine, this composite multilayer material is subjected to an oil boiling test at 150° C. After 250 hrs, 750 hrs and 1000 hrs, samples were taken and sections were examined under a microscope, in order to analyze the changes in layer structure.

Figure 4:
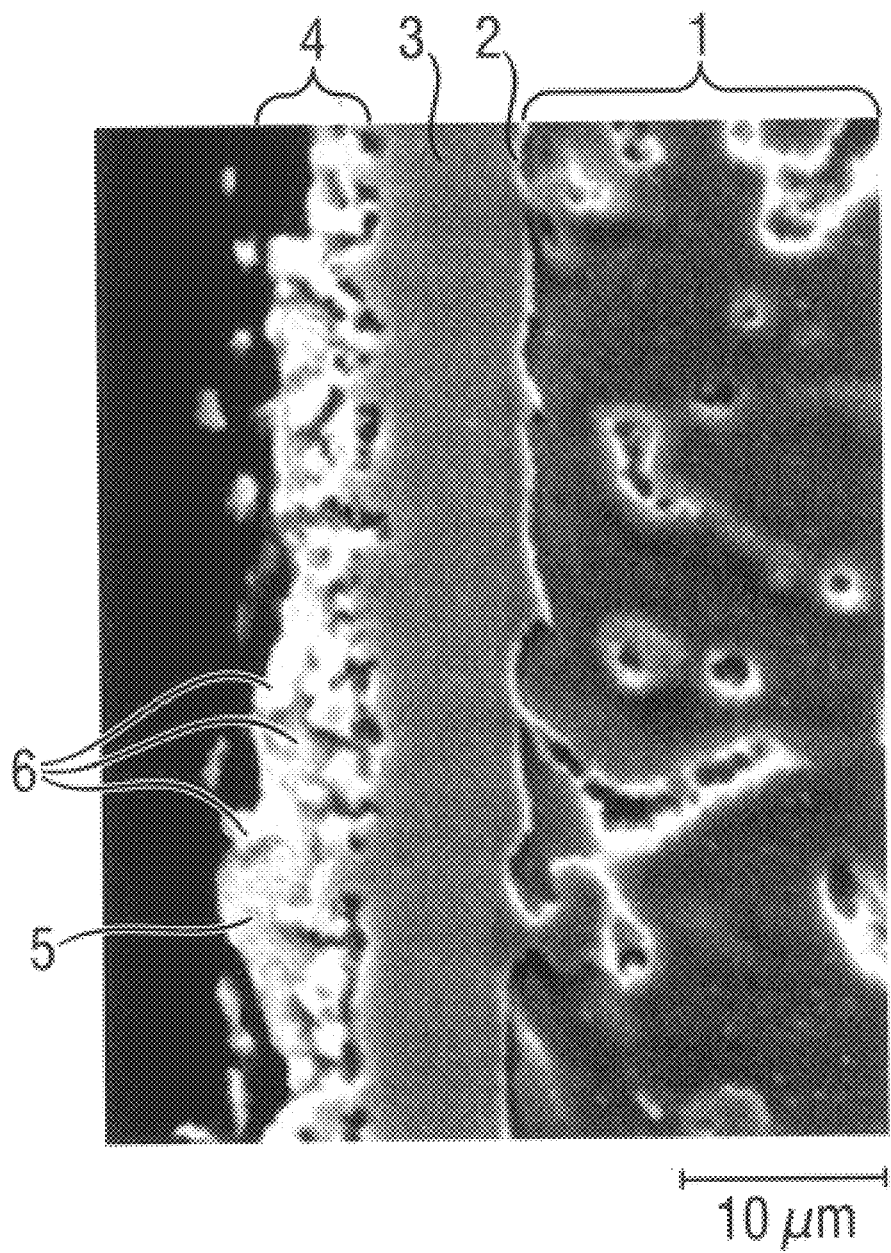
FIG. 4 shows a section through the composite multilayer material after heat treatment for 1000 hrs.

This examination showed that the thickness of the overlay 4 decreases as the duration of treatment increases as a result of the tin migration, which is accompanied by concentration of the tin-copper particles 6. At the same time, the thickness of the nickel-tin layer 3 also increases and the nickel layer 2 reduces, the latter being visible in FIG. 4 merely as a narrow fringe. Growth of the tin-nickel layer 3 is caused not only by diffusion thereinto of the tin from the overlay 4, but also by the penetration of nickel from the nickel layer 2 therebelow. Concentration of the tin-copper particles in the overlay 4 makes the soft phase fraction smaller and the hardness of the layer increases with a lengthening service life.

What is claimed is:

1. A composite multilayer material for plain bearings, comprising a backing layer, a bearing metal layer, a first intermediate layer of nickel, a second intermediate layer of tin and nickel together with an overlay consisting of copper and tin, characterized in that the overlay comprises a tin matrix into which tin-copper particles are incorporated, which consist of 39 to 55 wt. % copper, the rest being tin.

2. A composite multilayer material according to claim 1, characterized in that the content of particles per unit area, relative to any cross-sectional area, is between 5 to 48%.

3. A composite multilayer material according to claim 1, characterized in that the diameter of the particles is between 0.5 to 3 μm.

4. A composite multilayer material according to claim 1, characterized in that the second intermediate layer has a layer thickness and tin content enabling the second intermediate layer to absorb tin migrating out of the overlay.

5. A composite multilayer material according to claim 1, characterized in that the second intermediate layer contains 30 to 40 vol. % nickel.

6. A composite multilayer material according to claim 1, characterized in that the overlay and second intermediate layer have a ratio of respective layer thicknesses of 2 to 4.

7. A composite multilayer material according to claim 6, characterized in that the layer thickness of the overlay is 5 to 25 μm.

8. A composite multilayer material according to claim 7, characterized in that the layer thickness of the second intermediate layer is 2 to 7 μm.

9. A composite multilayer material according to claim 8, characterized in that the first intermediate layer has a layer thickness of 1 to 4 μm.

* * * * *